(12) United States Patent
Ashida et al.

(10) Patent No.: US 10,623,464 B2
(45) Date of Patent: Apr. 14, 2020

(54) DATA TRANSMISSION DEVICE AND DATA TRANSMISSION METHOD

(71) Applicant: NEC CORPORATION, Tokyo (JP)

(72) Inventors: Hiroko Ashida, Tokyo (JP); Akihiko Uwano, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 129 days.

(21) Appl. No.: 15/527,453

(22) PCT Filed: Nov. 19, 2015

(86) PCT No.: PCT/JP2015/082535
§ 371 (c)(1),
(2) Date: May 17, 2017

(87) PCT Pub. No.: WO2016/080482
PCT Pub. Date: May 26, 2016

(65) Prior Publication Data
US 2017/0324795 A1 Nov. 9, 2017

(30) Foreign Application Priority Data
Nov. 19, 2014 (JP) ................................ 2014-234524

(51) Int. Cl.
*H04L 29/06* (2006.01)
*G09C 1/00* (2006.01)
(Continued)

(52) U.S. Cl.
CPC .............. *H04L 65/605* (2013.01); *G09C 1/00* (2013.01); *H04L 47/10* (2013.01); *H04L 47/25* (2013.01);
(Continued)

(58) Field of Classification Search
CPC ... H04L 29/06027; H04L 47/10; H04L 47/24; H04L 47/25; H04L 47/30; H04L 63/0428; H04L 65/605
See application file for complete search history.

(56) References Cited

U.S. PATENT DOCUMENTS 6,959,327 B1  10/2005  Vogl et al.
7,581,019 B1  8/2009  Amir et al.
(Continued)

FOREIGN PATENT DOCUMENTS

JP    07-175763 A      7/1995
JP   2000-312224 A    11/2000
(Continued)

OTHER PUBLICATIONS

International Search Report of PCT/JP2015/082535 dated Feb. 16, 2016 [PCT/ISA/210].
(Continued)

*Primary Examiner* — Joe Chacko
(74) *Attorney, Agent, or Firm* — Sughrue Mion, PLLC

(57) ABSTRACT

A data transmission device mediates transmission/reception of data when delivering encrypted data between a server and a terminal device. The data transmission device includes a receiver for receiving encrypted data, a transmitter for transmitting data received by the receiver, and a controller for controlling data transmission speed depending on the amount of received data. The controller determines whether or not a series of data are subjected to initial transmission with respect to each series of data received by the receiver. Upon determining initial transmission data, the controller precludes the initial transmission data, among a series of data, from a transmission-speed limitation range so as to control the transmitter to transmit the initial transmission data. The controller limits the data transmission speed of the transmitter by way of pacing, and therefore the controller (Continued)

transmits data by switching between a pacing mode and a non-pacing mode.

5 Claims, 5 Drawing Sheets

(51) Int. Cl.
*H04L 12/801* (2013.01)
*H04L 12/825* (2013.01)
*H04L 12/835* (2013.01)
*H04L 12/851* (2013.01)

(52) U.S. Cl.
CPC .......... *H04L 47/30* (2013.01); *H04L 63/0428* (2013.01); *H04L 29/06027* (2013.01); *H04L 47/24* (2013.01)

(56) References Cited

U.S. PATENT DOCUMENTS

| | | | |
|---|---|---|---|
| 8,055,894 B2 | 11/2011 | Baker et al. | |
| 8,438,301 B2 | 5/2013 | Knowlton et al. | |
| 2003/0083870 A1 | 5/2003 | Lee et al. | |
| 2005/0021830 A1* | 1/2005 | Urzaiz | H04L 47/10 709/234 |
| 2006/0109856 A1* | 5/2006 | Deshpande | H04L 29/06027 370/412 |
| 2007/0053446 A1 | 3/2007 | Spilo | |
| 2009/0307367 A1 | 12/2009 | Gigliotti | |
| 2010/0011119 A1 | 1/2010 | Knowlton et al. | |
| 2010/0110892 A1 | 5/2010 | Lai et al. | |
| 2016/0088322 A1 | 3/2016 | Horev et al. | |

FOREIGN PATENT DOCUMENTS

| | | | |
|---|---|---|---|
| JP | 2002-084339 A | 3/2002 |
| JP | 2002-223202 A | 8/2002 |
| JP | 2004-015761 A | 1/2004 |
| JP | 2004-194104 A | 7/2004 |
| JP | 2004-357226 A | 12/2004 |
| JP | 2007027979 A | 2/2007 |
| JP | 2011-188429 A | 9/2011 |
| JP | 2012-182667 A | 9/2012 |
| JP | 2013179678 A | 9/2013 |
| WO | 2005/006664 A1 | 1/2005 |
| WO | 2008/108379 A1 | 9/2008 |
| WO | 2009149100 A1 | 12/2009 |
| WO | 2014/074650 A2 | 5/2014 |

OTHER PUBLICATIONS

Communication dated Jul. 24, 2018, issued by the Japan Patent Office in corresponding Japanese Application No. 2014-234524.
Communication dated Mar. 6, 2018 from the Taiwanese Intellectual Property Office in counterpart Application No. 104138177.
Communication dated Oct. 18, 2017, issued by the Intellectual Property Office of Taiwan in counterpart application No. 104138177.
Communication dated Apr. 11, 2018 from the Taiwanese Intellectual Property Office in counterpart application No. 104138177.
Communication dated Sep. 15, 2017 from the European Patent Office in counterpart European application No. 15861034.5.
Communication dated Feb. 18, 2019, from the European Patent Office in counterpart European Application No. 15861034.5.
Communication dated Oct. 21, 2019 from the State Intellectual Property Office of the P.R.C. in counterpart Application No. 201580061909.0.

* cited by examiner

DATA TRANSMISSION DEVICE AND DATA TRANSMISSION METHOD

CROSS REFERENCE TO RELATED APPLICATIONS

This application is a National Stage of International Application No. PCT/JP2015/082535, filed Nov. 19, 2015, claiming priority based on Japanese Patent Application No. 2014-234524, filed Nov. 19, 2014, the contents of all of which are incorporated herein by reference in their entirety.

TECHNICAL FIELD

The present invention relates to a data transmission device and a data transmission method for delivering data between a server and a terminal device.

BACKGROUND ART

Conventionally, engineers have developed technologies of efficiently delivering content data such as moving images. For example, PLT 1 discloses an interconversion method of multimedia data, which achieves efficient interconversion of multimedia data using multimedia pacing in a distributed data processing system. Specifically, a plurality of receiving stations are each designed to transmit a multimedia pacing request to a transmitting station in intervals of setting times via negotiation during a multimedia communication session. Herein, the multimedia pacing request includes an availability of a currently stored position of multimedia data in a receiving station, the information concerning the remaining time of minimum data at the stored position of a receiving station, and the information concerning interconversion of multimedia data. Then, the transmitting station assigns various priorities for data transmission to a plurality of receiving stations in an order reflecting a data format (i.e. multimedia data or non-multimedia data) and information of a multimedia pacing request concerning the remaining time of minimum data at each receiving station.

PLT 2 discloses a streaming method. Herein, a terminal determines a target value of streams (S_target), which should be stored in a buffer thereof depending on its own buffer capacity and a network transmission capability. In addition, the terminal arbitrarily writes head data of each stream into its own buffer within a range not exceeding a value that is obtained by dividing the buffer capacity by the transmission capability and then the terminal reads the head data so as to determine a delay time (T_delay) before the timing to start reproduction. The terminal notifies a server of a target value and a delay time. According to the notification by the terminal, the server controls transmission speed such that the buffer occupancy (Sum) of the terminal can be maintained in the neighborhood of the target value without exceeding the target value. Thus, it is possible to prevent failures in streaming reproduction irrespective of different buffer capacities of terminals depending on their types and irrespective of variations of network transmission capabilities, and therefore it is possible to reduce both the number of times concerning the occurrence of failures in streaming reproduction and the wait time of cueing.

PLT 3 discloses a data transmission method, which selectively controls a switching unit, connected between an input port unit having multiple input ports and an output window unit having multiple buffers, depending on the data stored condition for each of multiple buffers, stores data from multiple input ports on the vacant buffer among multiple buffers, and then transmits data, read from multiple buffers, in a time-division multiplexing manner. Thus, it is possible to reduce a possibility that input data will be destroyed due to overflowing or stagnation of processing in buffers, and therefore it is possible to reduce a possibility that the transmitting order of multisystem data will be changed. Herein, it is unnecessary to identify the header of data which may enter into the vacant buffer from each input port, and therefore it is possible to reduce delays without generating any buffer area useless for each output port and without the need of complex processing.

PLT 4 discloses a moving image delivery system, wherein a moving image delivery device changes a transmission rate of moving images with a predetermined bit rate based on an available bandwidth measured by a moving image playback device. Thus, it is possible to obtain good image quality in delivering moving images through networks undergoing significant fluctuations of bandwidths such as wireless packet networks.

PLT 5 discloses a wireless communication device. Specifically, a mobile phone includes a communication part for wirelessly transmitting data, an ECN (Explicit Congestion Notification) controller that, upon detecting network congestion, reduces a transmission window size, used for congestion avoidance, to be smaller than the foregoing one before the detection of congestion and then gradually increases the transmission window size, a token controller that sets a congestion avoidance mode during congestion avoidance or a normal node except for congestion avoidance, and a storage unit that stores a first value representing the transmission window size at the detection of congestion. Upon detecting congestion, the ECN controller notifies the token controller of an event to start congestion avoidance. When the transmission window size is changed to a second value specified based on the first value after the detection of congestion, the ECN controller notifies the token controller of an event to complete congestion avoidance. This guarantees the transition from the processing during congestion avoidance to the processing during the release of congestion avoidance at appropriate timing.

CITATION LIST

Patent Literature

PLT 1: Japanese Patent Application Publication No. H07-175763
PLT 2: Japanese Patent Application Publication No. 2002-84339
PLT 3: Japanese Patent Application Publication No. 2002-223202
PLT 4: Japanese Patent Application Publication No. 2004-357226
PLT 5: Japanese Patent Application Publication No. 2011-188429

SUMMARY OF INVENTION

Technical Problem

One of evaluation criteria for communication quality is QoE (Quality Of Experience). That is, QoE evaluates communication quality concerning sound interruption or smooth display of moving images experienced by users. To improve QoE, it is possible to set priorities of communications depending on types of data (i.e. types of contents) such as sound data, moving-image data, and text data. As for encrypted data, it is impossible to discriminate the type of data received by a transmission device, which may pose an obstacle to the improvement of QoE. It is difficult for the conventional technologies disclosed by PLT 1 through PLT 5 to improve QoE in transmitting encrypted data.

To address the above problem, the present invention aims to provide a data transmission device and a data transmission method for delivering data between a server and a terminal device by way of a pacing technology for encrypted communication (e.g. an SSL protocol).

Solution to Problem

A first aspect of the present invention relates to a data transmission device. The data transmission device includes a receiver configured to receive encrypted data, a transmitter configured to transmit data received by the receiver, and a controller configured to control data transmission speed of the transmitter depending on the amount of received data. The controller determines whether or not a series of data are subjected to initial transmission with respect to each series of data received by the receiver. Upon determining initial transmission data, the controller precludes the initial transmission data among a series of data from a transmission-speed limitation range so as to control the transmitter to transmit the initial transmission data.

A second aspect of the present invention relates to a data transmission method. The data transmission method includes the steps of: receiving encrypted data, transmitting received data, controlling data transmission speed depending on the amount of received data, determining whether or not a series of data are subjected to initial transmission upon receiving each series of data, and upon determining initial transmission data, precluding the initial transmission data, among a series of data, from a transmission-speed limitation range, thus transmitting the initial transmission data.

A third aspect of the present invention relates to a non-transitory computer-readable storage medium storing a program that causes a computer to implement the data transmission method.

Advantageous Effects of Invention

According to the present invention, it is possible to improve QoE by controlling data transmission speed depending on the amount of received data when data are encrypted and delivered between a terminal device and a server.

DESCRIPTION OF EMBODIMENTS

Figure 1:
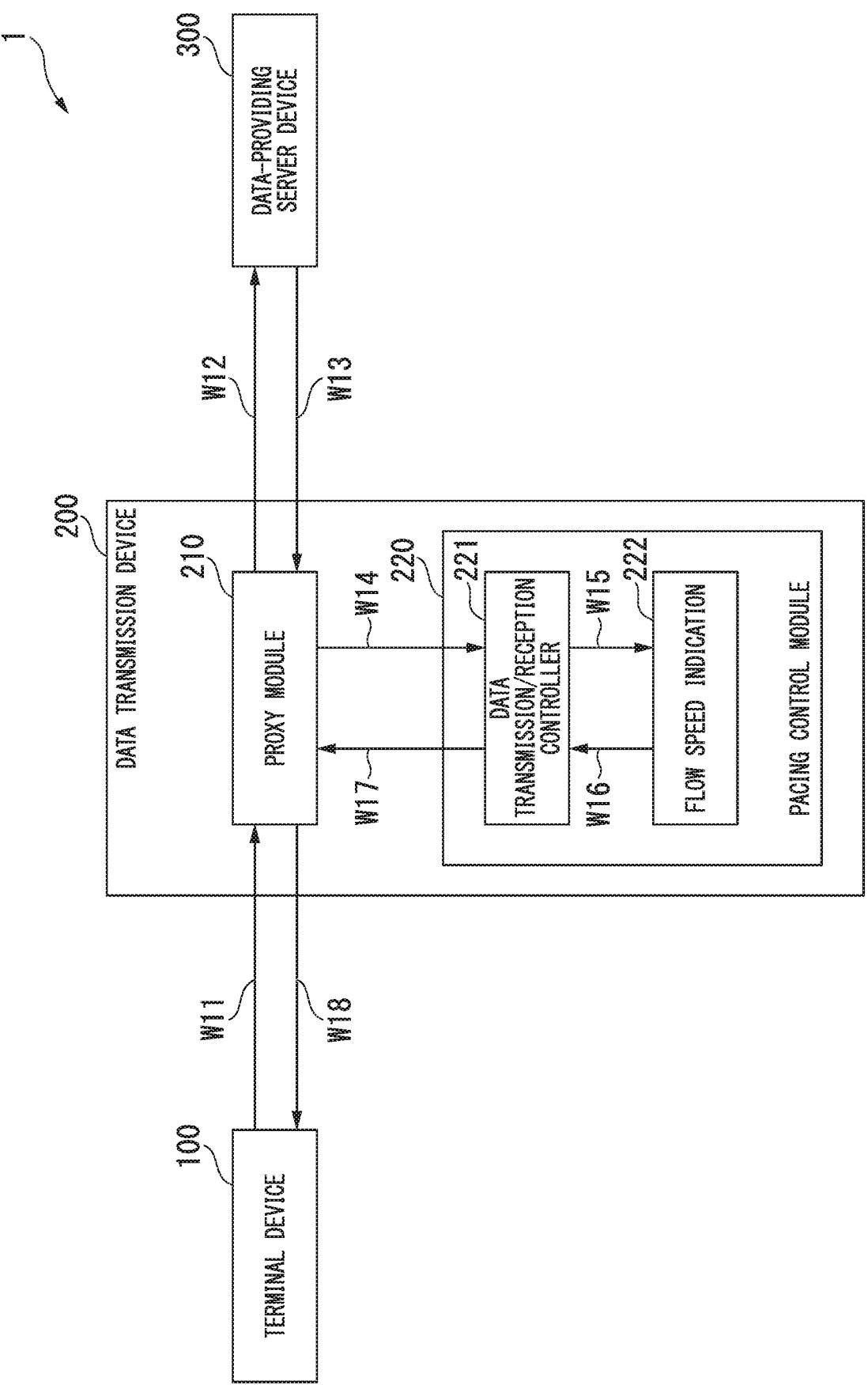
FIG. 1 is a block diagram showing the configuration of a communication system according to one embodiment of the present invention.

A data transmission device and a data transmission method according to the present invention will be described by way of examples with reference to the accompanying drawings. FIG. 1 is a block diagram showing the configuration of a communication system according to one embodiment of the present invention. The communication system 1 includes a terminal device 100, a data transmission device 200, and a data-providing server device 300. The data transmission device 200 includes a proxy module 210 and a pacing control module 220. The pacing control module 220 includes a data transmission/reception controller 221 and a flow speed indication part 222.

FIG. 1 shows a simplified configuration of the communication system 1, which should provide one or more terminal devices 100 and one or more data-providing server devices 300. The terminal device 100, the data transmission device 200, and the data-providing server device 300 can each be configured using a computer. In addition, the functions concerning the proxy module 210 and the pacing control module 220 can be aggregated into one device, or those functions can be realized using independent devices.

In the communication system 1, for example, the data-providing server device 300 may deliver data to the terminal device 100. In addition, the data-providing server device 300 transmits content data, which are continuously reproduced over time, such a moving images, sound, or any combination thereof. Herein, contents be moving images, still images, sound, text messages, or any combination thereof. As examples of contents, it is possible to mention movies, animations, and music.

The data-providing server device 300 encrypts at least part of data so as to deliver encrypted data. In the present embodiment, the data-providing server device 300 encrypts data according to an SSL (Secure Sockets Layer) protocol so as to deliver encrypted data. In this connection, the data-providing server device 300 employs an encryption method, which is not necessarily limited to the SSL protocol; hence, it is possible to employ various types of encryption technologies.

The terminal device 100 serves as an SSL-communication client in the communication system 1. The terminal device 100 transmits a content request (i.e. a signal requesting content delivery) to the data-providing server device 300 by way of the data transmission device 200. In addition, the terminal device 100 receives content data, as a response to a content request, from the data-providing server device 300 by way of the data transmission device 200.

The data-providing server device 300 serves as an SSL-communication server in the communication system 1. In response to a content request transmitted from the terminal device 100 via the data transmission device 200, the data-providing server device 300 transmits the corresponding content data to the terminal device 100 via the data transmission device 200. At this time, the data-providing server device 300 encrypts content data according to the SSL protocol so as to transmit encrypted data to the data transmission device 200.

The data transmission device 200 relays communication between the terminal device 100 and the data-providing server device 300. In particular, the data transmission device 200 autonomously adjusts the data transmission timing (e.g. transmission speed) for the terminal device 100 when transmitting received data from the data-providing server device 300 to the terminal device 100. For example, the data transmission device 200 communicates with the terminal device 100 through mobile networks (i.e. communication networks provided by common carriers for use in communications for smartphones and mobile phones) such as LTE (Long Term Evolution: a registered trademark) and eUTRAN (evolved Universal Terrestrial Radio Access Network). In this connection, the data transmission device 200 is connected to communication networks, which are not necessarily limited to mobile networks; the data transmission device 200 is connectible to various types of communication networks. That is, communication networks should be networks that allow the data transmission device 200 to control the timing of transmitting received data from the data-providing server device 300 to the terminal device 100.

The proxy module 210 serves as a proxy of the terminal device 100. The proxy module 210 transfers content data, transmitted from the data-providing server device 300, to the pacing control module 220. That is, the proxy module 210 serves as a receiver for receiving content data from the data-providing server device 300. In addition, the proxy module 210 serves as a transmitter for transmitting content data to the terminal device 100. The present embodiment is designed such that the proxy module 210 serves as a transparent proxy, but this is not a restriction. The transparent proxy is designed to realize proxy communication without implementing proxy setting for the browser of the terminal device 100.

The pacing controller 220 control data transmission speed of the proxy module 210 in real time. In particular, the pacing controller 220 controls data transmission speed for transmitting data from the data transmission device 200 to the terminal device 100 in real time. The pacing control module 220 serving as a controller is designed to determine whether or not a series of data are subjected to initial transmission with respect to each series of data received from the data-providing server device 300. Herein, it is possible to use various methods for determining a series of data or not. For example, it is possible for the pacing control module 220 to determine a series of data with respect to a group of data which are transmitted from the data-providing server device 300 to the terminal device 100 at time intervals within a predetermined interval of time. Alternatively, it is possible for the pacing control module 220 to determine a series of data or not by taking into account how long data transmission from the data-providing server device 300 to the terminal device 100 is continued within a predetermined interval of time. For example, it is possible to determine a series of data with respect to data transmission being continued for a certain time or more. Alternatively, it is possible for the pacing control module 220 to determine a series of data with respect to data being transmitted through the same communication pathway according to communication pathway setting such as VPN (Virtual Private Network) setting.

The purpose of discriminating a series of data from other data is to secure and transmit a certain amount of data subjected to initial transmission without causing interruption during the reproduction of the terminal device 100 when transmitting content data, such as moving images, sound, and their combinations, which should be continuously reproduced with respect to time. Therefore, it is preferable that a group of data, corresponding to the same content subjected to streaming delivery by the data-providing server device 300, be included in a series of data.

Upon determining a series of data subjected to initial transmission, the pacing control module 220 precludes initial transmission data from a series of data which should be limited in transmission speed so as to control the proxy module 210 to transmit the initial transmission data to the terminal device 100 at the maximum transmission speed. In addition, the data transmission/reception controller 221 imposes the transmission-speed limitation to the proxy module 210, which in turn avoids congestion in transmitting data. Herein, the maximum transmission speed represents the maximum speed at which the proxy module 210 is able to transmit data. The maximum transmission speed is set by the flow speed indication part 222.

The present embodiment provides a pacing mode for controlling pacing with respect to the data transmission speed of the proxy module 210 and a non-pacing mode for inhibiting pacing with respect to the data transmission of the proxy module 210. That is, the pacing control module 220 shifts from the pacing mode to the non-pacing mode when the amount of data received by the proxy module 210 satisfies a predetermined condition. Herein, the pacing refers to a limitation imposed on transmission speed by arranging free time in data transmission. For example, pacing for packet communication adjusts packet transmission speed by adjusting free time occurred between the timing of transmitting a certain packet and the timing of transmitting the next packet. That is, the pacing mode is an example of a speed limiting mode while the non-pacing mode is an example of a non-speed limiting mode.

As described above, the pacing control module 220 switches between the pacing mode and the non-pacing mode based on the amount of data received by the proxy module 210. Thus, the pacing control module 220 controls the proxy module 210 to carry out data transmission at the maximum transmission speed on the condition that all data can be transmitted at the maximum transmission speed since the amount of data received by the proxy module 210 is relatively small. In this connection, the data transmission device 200 employs a method of limiting data transmission speed, which is not necessarily limited to a pacing method. For example, the data transmission/reception controller 221 may adjust the data transmission speed of the proxy module 210 in addition to or instead of the adjusting operation of the data transmission/reception controller 221 to adjust time intervals for transmitting data via the proxy module 210.

Due to the transition from the pacing mode to the non-pacing mode, the pacing control module 220 precludes transmission data released from transmission speed limitation among a series of data, i.e. at least part of data transmitted by the proxy module 210, from the transmission-speed limitation range so as to control the proxy module 210 to transmit the transmission data. Similar to a series of data subjected to initial transmission, it is possible for the proxy module 210, which is released from the transmission speed limitation, to secure and transmit a certain amount of data without causing interruption in the reproduction of the terminal device 100 when transmitting content data, such as moving images, sound, and their combinations, which will be continuously reproduced with respect to time. The present embodiment makes a setting that the amount of transmission data released from the transmission speed limitation be identical to the amount of data subjected to initial transmission; but this is not a restriction. For example, it is possible to make another setting that the amount of transmission data released from the transmission speed limitation be different from the amount of data subjected to initial transmission.

The data transmission/reception controller 221 controls the proxy module 210 transmitting or receiving data in response to the data transmission speed indicated by the flow speed indication part 222. In addition, the data transmission/reception controller 221 notifies the flow speed indication part 222 of the transmission delay status and the amount of data received by the proxy module 210.

The flow speed indication part 222 determines the data transmission speed for the proxy module 210 based on various pieces of information such as the transmission delay status and the amount of data received by the proxy module 210. In particular, the flow speed indication part 222 determines the data transmission speed for the proxy module 210 according to the data transmission mode by dynamically switching the data transmission mode depending on the data transmission/reception status of the proxy module 210.

As the data transmission mode, the present embodiment provides a non-pacing mode, a pacing mode, and a limitation cancellation mode. The non-pacing node allows the proxy module 210 to transmit data at the maximum transmission speed without imposing any limitation to the data transmission speed. The pacing mode limits the data transmission speed. In the pacing mode, the proxy module 210 transmits data at the pacing-transmission speed. Herein, the data transmission/reception controller 221 may set the pacing-transmission speed. Alternatively, it is possible to determine the pacing-transmission speed in advance. The transition from the pacing mode to the non-pacing mode causes the transition to the limitation cancellation mode with the flow speed indication part 222. As described above, in the limitation cancellation mode, the proxy module 210 precludes at least part of a series of data, i.e. transmission data subjected to the limitation cancellation, from the transmission-speed limited data so as to transmit those data.

In FIG. 1, reference signs W11 through W18 indicate pathways showing flows of data between functional blocks, wherein those pathways are not necessarily correlated to data transmission pathways in a one-to-one correspondence manner. In FIG. 1, data flows are caused to occur in the following order.

(1) The terminal device 100 transmits a content request to the proxy module 210 via the pathway W11.
(2) The proxy module 210 transmits a content request from the terminal device 100 to the data-providing server device 300 via the pathway W12.
(3) The data-providing server device 300 transmits content data, suited to a content request from the terminal device 100, to the proxy module 210 via the pathway W13.
(4) The proxy module 210 notifies the data transmission/reception controller 211 of the information, concerning the amount of received data and the transmission delay status, via the pathway W14.
(5) The data transmission/reception controller 221 transfers to the flow speed indication part 222 the information concerning the amount of received data and the transmission delay status in the proxy module 210 via the pathway W15.
(6) The flow speed indication part 222 determines a transmission speed indication based on the information concerning the amount of received data and the transmission delay status in the proxy module 210 so as to notify the data transmission/reception controller 221 of the transmission speed indication via the pathway W16.
(7) The data transmission/reception controller 221 outputs a control instruction, concerning the transmission timing (e.g. the transmission speed) of content data with the proxy module 210, based on the transmission speed indication from the flow speed indication part 222 via the pathway W17.
(8) Under the control of the data transmission/reception controller 221, the proxy module 210 transmits content data from the data-providing server device 300 to the terminal device 100 via the pathway W18.

Figure 2:
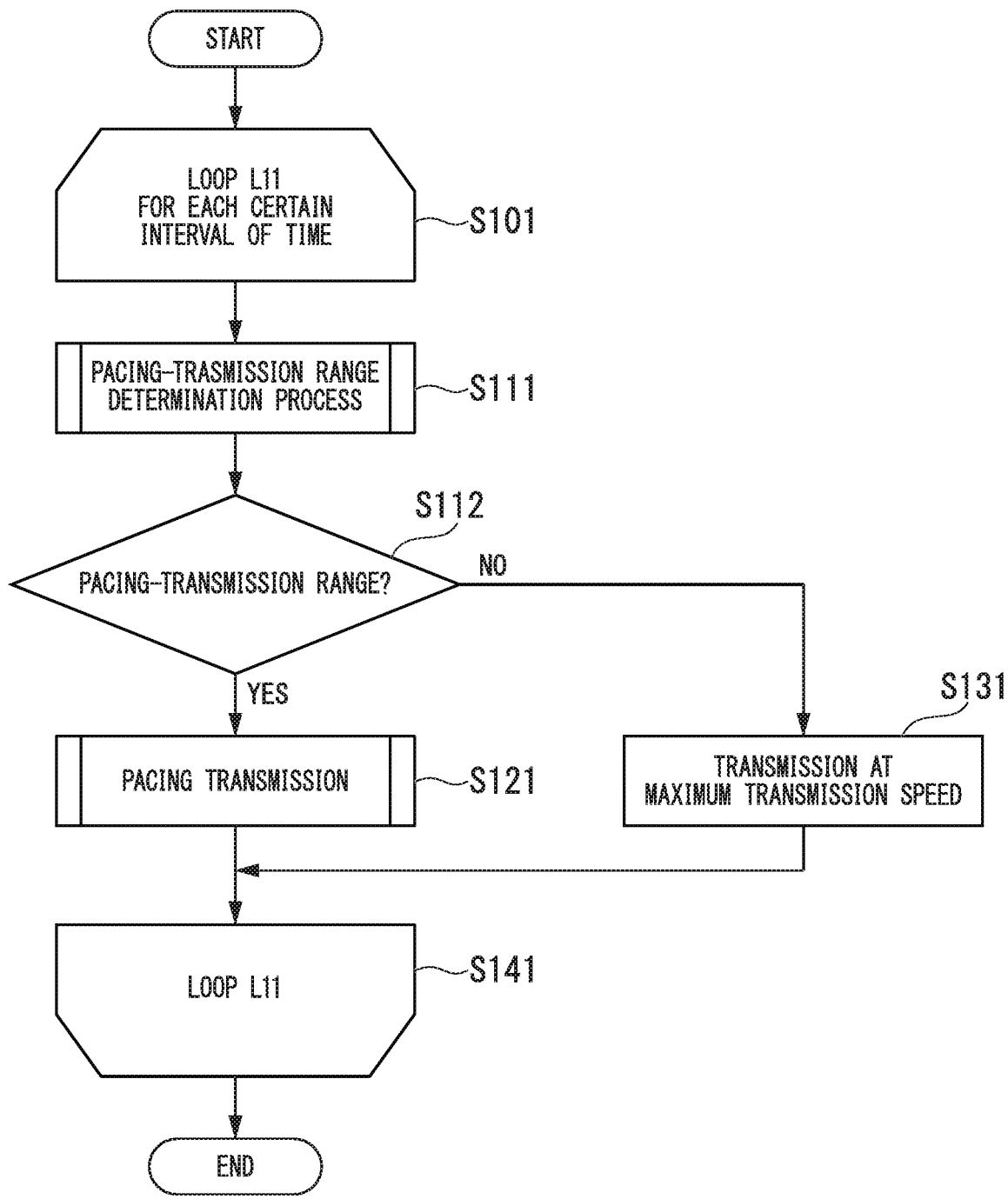
FIG. 2 is a flowchart showing an example of a procedure that a data transmission device transmits data from a data-providing server device to a terminal device in the communication system.

Next, the operation of the data transmission device 200 will be described with reference to FIGS. 2 to 4. FIG. 2 is a flowchart showing an example of a procedure that the data transmission device 200 transmits data from the data-providing server device 300 to the terminal device 100. First, the data transmission device 200 starts a loop L11 for executing processes for a certain interval of time (i.e. a segment SG) (step S101). A certain interval of time is a predetermined time that is set as a time for measuring the amount of data being transmitted or received with the proxy module 210. The data transmission device 200 repeats the loop L11 in a transmittable condition for transmitting data from the data-providing server device 300 to the terminal device 100.

In the loop L11, the proxy module 210 notifies the information representing the transmission/reception status (in particular, the amount of received data and the transmission delay status) to the flow speed indicator 222 via the data transmission/reception controller 221, and therefore the flow speed indication part 222 carries out a pacing-transmission range determination process based on the information from the proxy module 210 (step S111). Herein, the pacing-transmission range determination process determines whether or not the proxy module 210 should impose limitation to the data transmission speed.

Next, the flow speed indicator 222 determines whether the proxy module 210 carries out pacing transmission or data transmission at the maximum transmission speed based on the determination result of step S111 (step S112). Specifically, when the flow speed indication part 222 determines the transmission data in a certain interval of time within a pacing-transmission range, (step S112: YES), the data transmission/reception controller 221 controls the proxy module 210 to transmit the data from the data-providing server device 300 to the terminal device 100 by way of pacing transmission (step S121). Herein, the pacing transmission is the data transmission at the pacing-transmission speed limiting the transmission speed. Thereafter, the data transmission device 200 carries out a termination process of the loop L11 (step S141). That is, the processing of the data transmission device 200 returns to step S101, thus repeating the loop L11.

On the other hand, when the flow speed indication part 222 determines the transmission data in a certain interval of time out of a pacing-transmission range (step S112: NO), the data transmission/reception controller 221 controls the proxy module 210 to transmit the data from the data-providing server device 300 to the terminal device 100 at the maximum transmission speed (step S131). After step S131, the processing proceeds to step S141.

Figure 3:
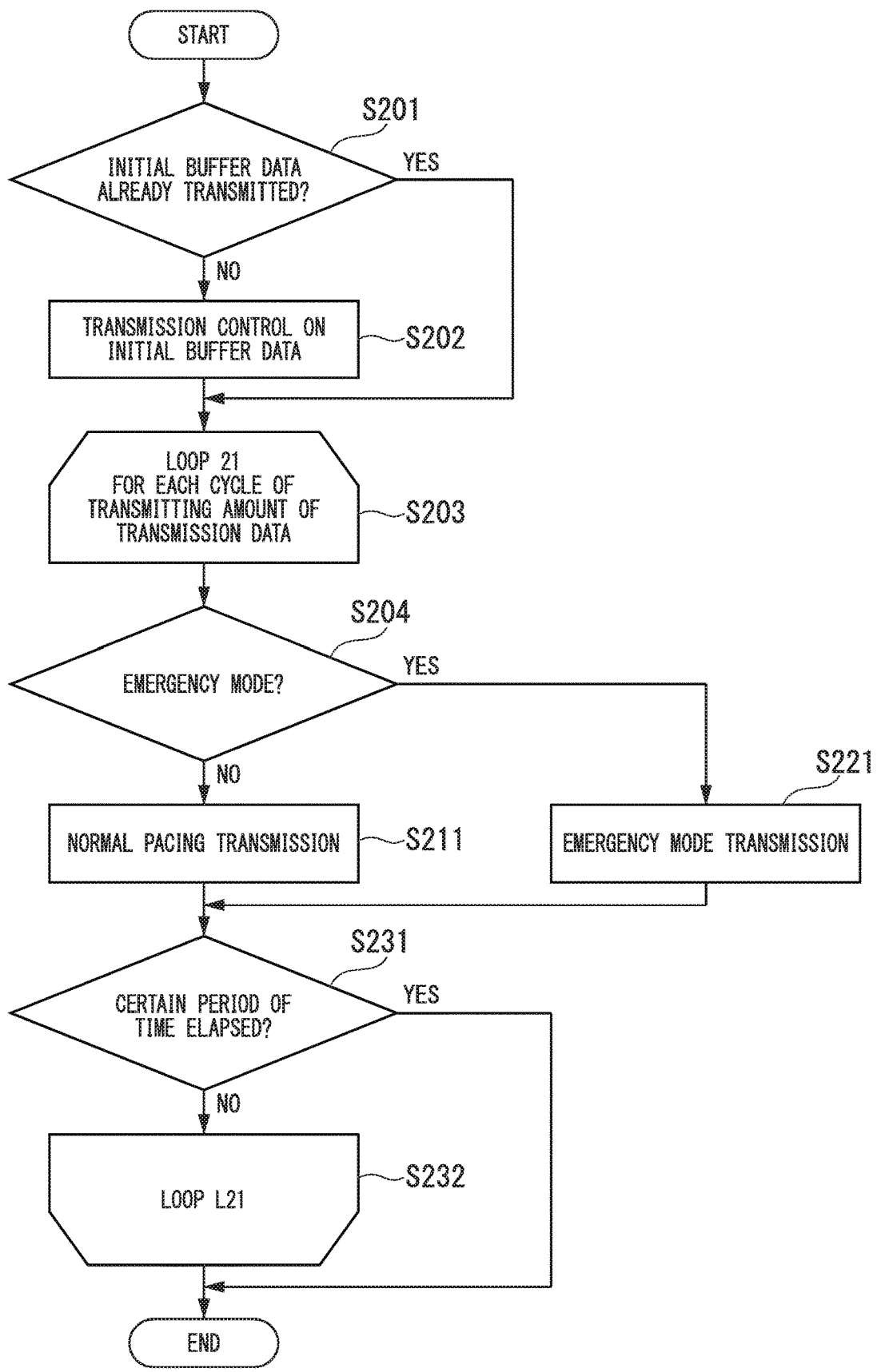
FIG. 3 is a flowchart showing an example of a procedure that a data transmission device carries out pacing transmission in the communication system.

FIG. 3 is a flowchart showing an example of a procedure that the data transmission device 200 carries out pacing transmission. The data transmission device 200 carries out the procedure of FIG. 3 in step S121 of FIG. 2. In FIG. 3, the data transmission/reception device 221 determines whether or not initial buffer data have been already transmitted with respect to a series of data that the proxy module 210 transmits in the next interval of time (step S201). As described above, the initial buffer data are provided for the purpose of securing and transmitting a certain amount of data at the initial transmission of a series of data, and therefore the initial buffer data are transmitted at the maximum transmission speed. A series of data are correlated to an initial-transmission completion flag, and therefore it is possible to determine as to whether or not initial buffer data have been already transmitted by setting a transmission-completion value to the initial-transmission completion flag when transmitting data.

When it is determined that initial buffer data have not been already transmitted (step S201: NO), the data transmission/reception controller 221 controls the proxy module 210 to transmit the initial buffer data at the maximum transmission speed (step S202). The step S202 is carried out by clearing the initial-transmission completion flag at the restoration from the pacing mode, and therefore it is possible to secure and transmit a certain amount of data. The amount of data is subjected to the processing of the limitation cancellation mode.

Next, the data transmission device 200 starts a loop L21 every time it transmits the amount of transmission data (step S203). Herein, the amount of transmission data means the unit of transmission data according to the pacing mode.

In the loop L21, the data transmission/reception controller 221 determines an emergency mode or not (step S204). For example, the data transmission/reception controller 221 compares the amount of data, which should be transmitted in a predetermined time before the current timing (i.e. the timing of determination of step S204) at the flow speed (or the communication speed) that the flow speed indication part 222 indicates to the proxy module 210, with the amount of data actually transmitted by the proxy module 210. Thus, the data transmission/reception controller 221 determines the emergency mode when the amount of data actually transmitted by the proxy module 210 is smaller than the amount of data, which should be transmitted by the proxy module in the predetermined time, by a predetermined value or more.

When the data transmission/reception controller 211 does not determine the emergency mode (step S204: NO), the data transmission/reception controller 221 controls the proxy module 210 to transmit data at the pacing-transmission speed (step S211). Herein, the pacing-transmission speed is obtained by dividing the amount of transmission data by the time required to transit the amount of transmission data by the proxy module 210. For example, the data transmission/reception controller 221 controls the data transmission speed of the proxy module 210 by indicating the time required to transmit the amount of transmission data to the proxy module 210. In step S211, the proxy module 210 carries out normal pacing transmission.

Next, the data transmission device 200 determines whether or not a certain interval of time has been elapsed (step S231). Upon determining that a certain interval of time has been elapsed (step S231: YES), the data transmission device 200 terminates the loop L21 so as to exit the procedure of FIG. 3. Upon determining that a certain interval of time has not been elapsed (step S231: NO), the data transmission device 200 carries out a termination process of the loop L21 (step S232). That is, the processing returns to step S203, thus repeating the loop L21.

When it is determined that the initial buffer data have been already transmitted in step S201 (step S201: YES), the processing proceeds to step S203. Upon determining the emergency mode in step S204 (step S204: YES), the data transmission/reception controller 221 controls the proxy module 210 to activate an exceptional measure for transmitting data at the maximum transmission speed (step S221). This data transmission will be referred to as emergency mode transmission. After step S221, the processing proceeds to step S231.

Figure 4:
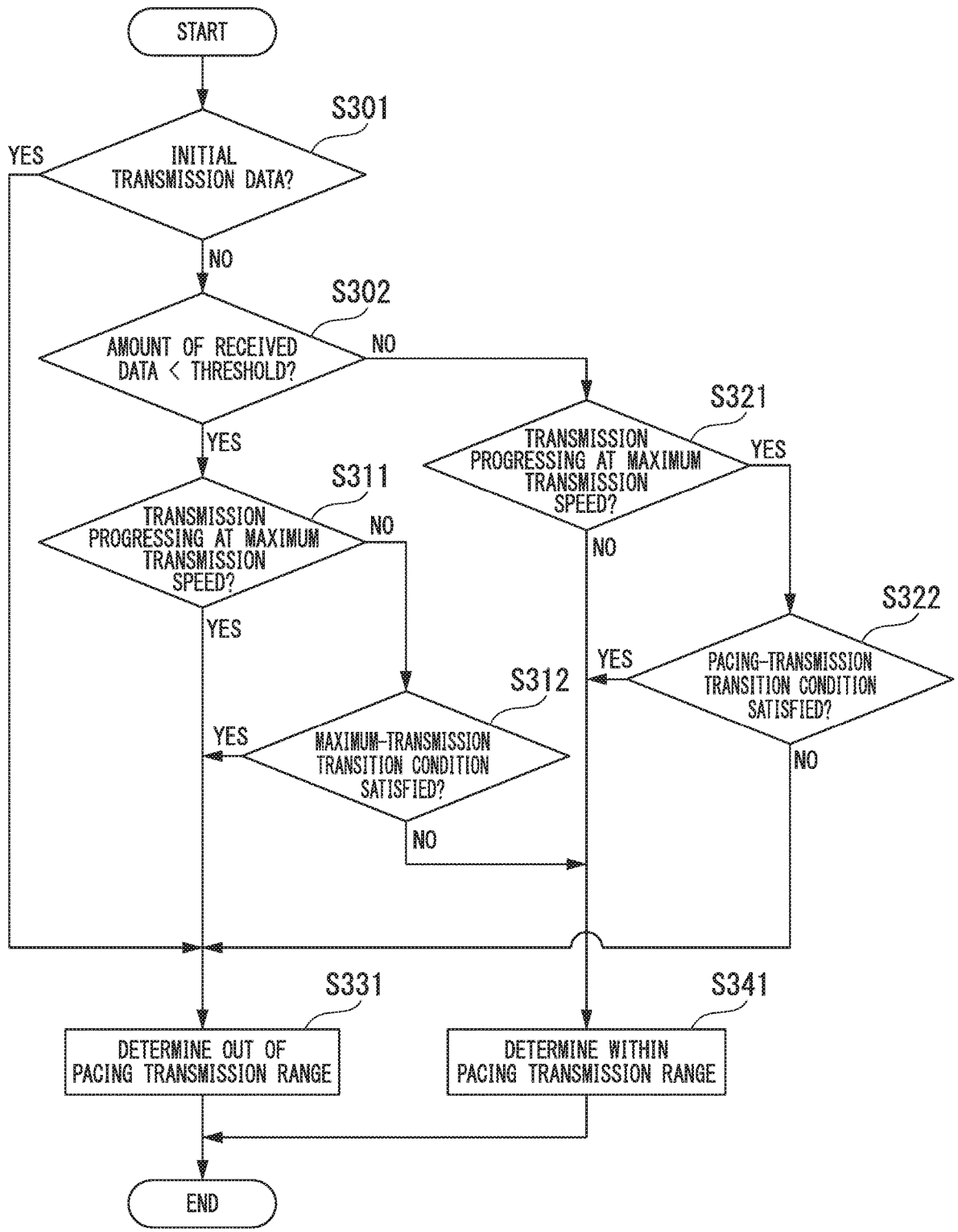
FIG. 4 is a flowchart showing an example of a procedure that a data transmission device determines a pacing-transmission range in the communication system.

FIG. 4 is a flowchart showing an example of a procedure that the data transmission device 200 determines a pacing-transmission range. The data transmission device 200 carries out the procedure of FIG. 4 in step S111 of FIG. 2. In FIG. 4, the flow speed indication part 222 determines data subjected to initial transmission (step S301). When the flow speed indication part 222 does not determine the initial transmission data (step S301: NO), the flow speed indication part 222 determines whether or not the amount of data received by the proxy module 210 is less than a predetermined threshold representing the amount of data subjected to the pacing-transmission range (step S302).

Upon determining that the amount of data received by the proxy module 210 is smaller than the predetermined threshold (i.e. the amount of data subjected to the pacing-transmission range) (step S302: YES), the flow speed indication part 222 determines whether or not the proxy module 210 is currently transmitting data at the maximum transmission speed (step S311). The step S311 determines whether the proxy module 210 transmits data in the pacing mode (step S121 of FIG. 2) or whether the proxy module 210 transmits data in the non-pacing mode (step S131 of FIG. 2). Upon determining that the proxy module 210 is currently transmitting data at the maximum transmission speed in step S311 (step S311: YES), the flow speed indication part 222 determines the transmitting data to be out of the pacing process (step S331). Then, the data transmission device 200 exits the procedure of FIG. 4.

When the flow speed indication part 222 determines data subjected to initial transmission in step S301 (step S301: YES), the processing proceeds to step S331. Upon determining that the proxy module 210 is currently transmitting data at the maximum transmission speed (step S311: YES), the flow speed indication part 222 determines the transmitting data subjected to the pacing process (step S341). Then, the data transmission device 200 exits the procedure of FIG. 4.

Upon determining that the proxy module 210 is not currently transmitting data at the maximum transmission speed (step S311: NO), the flow speed indication part 222 determines whether or not the amount of received data satisfies the maximum-transmission transition condition (step S312). For example, the flow speed indication part 222 calculates a difference between the amount of data received by the proxy module 210 for each unit time and the amount of data transmittable at the maximum transmission speed. When the amount of received data of the proxy module 210 continuously falls below the amount of transmittable data at the maximum transmission speed by a predetermined value or more for a predetermined time, the flow speed indication part 222 determines that the amount of received data satisfies the maximum-transmission transition condition. When it is determined that the amount of received data satisfies the maximum-transmission transition condition (step S312: YES), the processing proceeds to step S331. When it is determined that the amount of received data does not satisfy the maximum-transmission transition condition (step S312: NO), the processing proceeds to step S341.

Upon determining that the amount of received data of the proxy module 210 is equal to or more than the predetermined threshold (i.e. the amount of data subjected to the pacing transmission range) in step S302 (step S302: NO), the flow speed indication part 222 determines whether or not the proxy module 210 is currently transmitting data at the maximum transmission speed (step S321). The step S321 determines whether the proxy module 210 is transmitting data in the pacing mode (step S121 of FIG. 2) or whether the proxy module 210 is transmitting data in the non-pacing mode (step S131 of FIG. 2).

Upon determining that the proxy module 210 is transmitting data at the maximum transmission speed in step S321 at the maximum transmission speed (step S321: YES), the flow speed indication part 222 determines whether or not the amount of received data satisfies the pacing-transmission transition condition (step S322). For example, the flow speed indication part 222 calculates a difference between the amount of received data of the proxy module 210 for each unit time and the amount of transmittable data at the maximum transmission speed. Upon determining that the amount of received data of the proxy module 210 continuously exceeds the amount of transmittable data at the maximum transmission speed by the predetermined value or more for the predetermined time, the flow speed indication part 222 determines that the amount of received data satisfies the pacing-transmission transition condition (step S322: YES), the processing proceeds to step S341. When it is determined that the amount of received data does not satisfy the pacing-transmission transition condition (step S322: NO), the processing proceeds to step S331.

As described above, the proxy module 210 receives or transmits encrypted data. In addition, the pacing control module 220 controls the data transmission speed of the proxy module 210. In particular, the pacing control module 220 determines whether or not a series of data are subjected to the initial transmission with respect to each series of data received by the proxy module 210. Upon determining the initial transmission data, the pacing control module 220 precludes the initial transmission data, among a series of data, from the transmission-speed limiting range so as to control the proxy module 210 to transmit the initial transmission data. Thus, it is possible for the data transmission device 200 to secure and transmit a certain amount of data to the terminal device 100 at the timing to start transmitting a series of data even when the proxy module 210 receives encrypted data; hence, it is possible to improve QoE.

When the amount of data of the proxy module 210 satisfies the predetermined condition, the pacing control module 220 shifts from the pacing mode implementing pacing to limit the data transmission speed of the proxy module 210 to the non-pacing mode not implementing pacing on the data transmission of the proxy module 210. Thus, it is possible for the data transmission device 200 to control the proxy module 210 to transmit data at the maximum transmission speed when the amount of received data of the proxy module 210 is relatively small; hence, it is possible to efficiently transmit data.

Due to the transition from the pacing mode to the non-pacing mode, the pacing control module 220 precludes transmission data (e.g. initial buffer data in FIG. 3) released from the transmission speed limitation among a series of data, i.e. at least part of a series of data transmitted by the proxy module 210, from the transmission speed limitation range so as to control the proxy module 210 (or a transmitter) to transmit the transmission data. Similar to the timing to start transmitting a series of data, when the proxy module 210 receives encrypted data released from transmission speed limitation, it is possible for the data transmission device 200 to secure and transmit a certain amount of data, among a series of data, to the terminal device 100; hence, it is possible to improve QoE.

Figure 5:
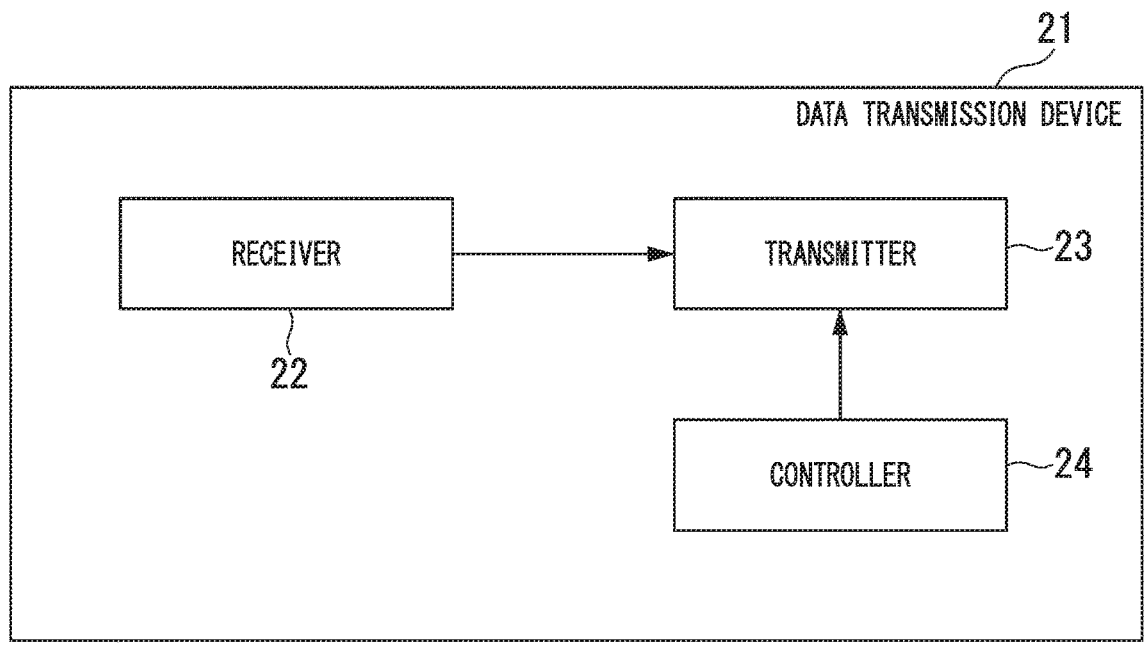
FIG. 5 is a block diagram showing the minimum configuration of a data transmission device according to the present invention.

Next, the minimum configuration of a data transmission device 21 will be described with reference to FIG. 5. FIG. 5 is a block diagram showing the minimum configuration of the data transmission device 21 according to the present invention. The data transmission device 21 includes a receiver 22, a transmitter 23, and a controller 24. The receiver 22 receives encrypted data. The transmitter 23 transmits data received by the receiver 22. The controller 24 controls the data transmission speed of the transmitter 23.

The controller 24 determines whether or not a series of data are subjected to the initial transmission with respect to each series of data received by the receiver 22. The controller 24 precludes the initial transmission data, among a series of data, from the transmission-speed limitation range so as to control the transmitter 23 to transmit the initial transmission data. Thus, it is possible for the data transmission device 21 to secure and transmit a certain amount of data at the timing to start transmitting a series of data when the receiver 22 receives encrypted data; hence, it is possible to improve QoE.

In this connection, it is possible to store programs, realizing part or the entirety of the functionality of the data transmission device 200 in computer-readable storage media, and therefore it is possible to implement the processes concerning the constituent elements shown in FIG. 1 by way of a computer system reading and executing programs stored in storage media. Herein, the "computer system" embrace the OS (operating system) and hardware such as peripheral devices. In addition, the "computer system" using the WWW system may embrace the homepage-providing environment (or the homepage-displaying environment).

The "computer-readable storage media" refer to flexible disks, magneto-optical disks, ROM, portable media such as CD-ROM, and storage units such as hard disks embedded in computer system. Alternatively, the "computer-readable storage media" may embrace communication measures for dynamically holding programs for a short period of time when transmitting programs through communication lines, telephone lines, or networks such as the Internet. In addition, the "computer-readable storage media" may embrace any means for holding programs for a certain period of time such as volatile memory installed in computer system acting as server or client.

The foregoing programs may achieve part of the functionality of the data transmission device 200, or the foregoing programs can be combined with other programs pre-installed in computer system so as to partially achieve the functionality.

Lastly, the present invention has been described in detail by way of the embodiment with reference to the accompanying drawings; however, the concrete configuration of the present invention should not be limited to the foregoing embodiment; hence, the present invention may embrace any modifications or design changes not deviated from the subject matter of the invention.

INDUSTRIAL APPLICABILITY

The present invention provides a data transmission device and a data transmission method that receives or transmits data using a pacing technology when delivering encrypted data between a server and a terminal device. The present invention is designed to adjust data transmission speed when delivering various content data, and therefore it is possible to improve communication quality (e.g. QoS) irrespective of the execution or non-execution of encryption.

REFERENCE SIGNS LIST 1 communication system
100 terminal device
200 data transmission device 210 proxy module
220 pacing control module
221 data transmission/reception controller
222 flow speed indication part
300 data-providing server device

The invention claimed is:

1. A data transmission device comprising:
a receiver configured to receive encrypted data;
a transmitter configured to transmit the received data of the receiver; and
a controller configured to control transmission speed of the transmitter according to an amount of the received data,
wherein the controller transmits initial transmission data among the received data without limiting the transmission speed,
wherein the controller transmits remaining data among the received data by way of pacing transmission for adjusting time intervals between packets of the remaining data to be sequentially transmitted upon determining whether to carry out the pacing transmission with respect to the remaining data among the received data according to (a) and (b):
(a) determining that the remaining data be not subjected to the pacing transmission when the remaining data are currently transmitted at maximum transmission speed except for a pacing transmission transition condition when the amount of the received data is above a predetermined threshold, and
(b) determining that the remaining data be subjected to the pacing transmission when the remaining data are not currently transmitted at the maximum transmission speed except for a maximum-speed transmission transition condition when the amount of the received data is below the predetermined threshold.

2. A data transmission method comprising:
receiving encrypted data;
transmitting the received data;
controlling transmission speed for transmitting the received data according to an amount of the received data;
determining to transmit initial transmission data among the received data without limiting the transmission speed;
determining to transmit remaining data among the received data by way of pacing transmission for adjusting time intervals between packets of the remaining data to be sequentially transmitted upon
determining whether to carry out the pacing transmission with respect to remaining data among according to (a) and (b):
(a) determining that the remaining data be not subjected to the pacing transmission when the remaining data are currently transmitted at maximum transmission speed except for a pacing transmission transition condition when the amount of the received data is above a predetermined threshold, and
(b) determining that the remaining data be subjected to the pacing transmission when the remaining data are not currently transmitted at the maximum transmission speed except for a maximum-speed transmission transition condition when the amount of the received data is below the predetermined threshold.

3. A non-transitory computer-readable storage medium storing a program that causes a computer to implement the data transmission method according to claim 2.

4. The data transmission device according to claim 1, wherein the pacing transmission transition condition indicates when the amount of the received data is continuously above a predetermined amount of data transmittable at maximum speed for a predetermined time while the maximum-speed transmission transition condition indicates when the amount of the received data is continuously below the predetermined amount of data transmittable at maximum speed for the predetermined time.

5. The data transmission method according to claim 2, wherein the pacing transmission transition condition indicates when the amount of the received data is continuously above a predetermined amount of data transmittable at maximum speed for a predetermined time while the maximum-speed transmission transition condition indicates when the amount of the received data is continuously below the predetermined amount of data transmittable at maximum speed for the predetermined time.

* * * * *